Jan. 21, 1958     D. PARRETT     2,820,538
ADJUSTABLE CLUTCH RELEASE AND OPERATING MECHANISM
Filed Feb. 4, 1954     3 Sheets-Sheet 1

INVENTOR.

Jan. 21, 1958 D. PARRETT 2,820,538
ADJUSTABLE CLUTCH RELEASE AND OPERATING MECHANISM
Filed Feb. 4, 1954 3 Sheets-Sheet 2
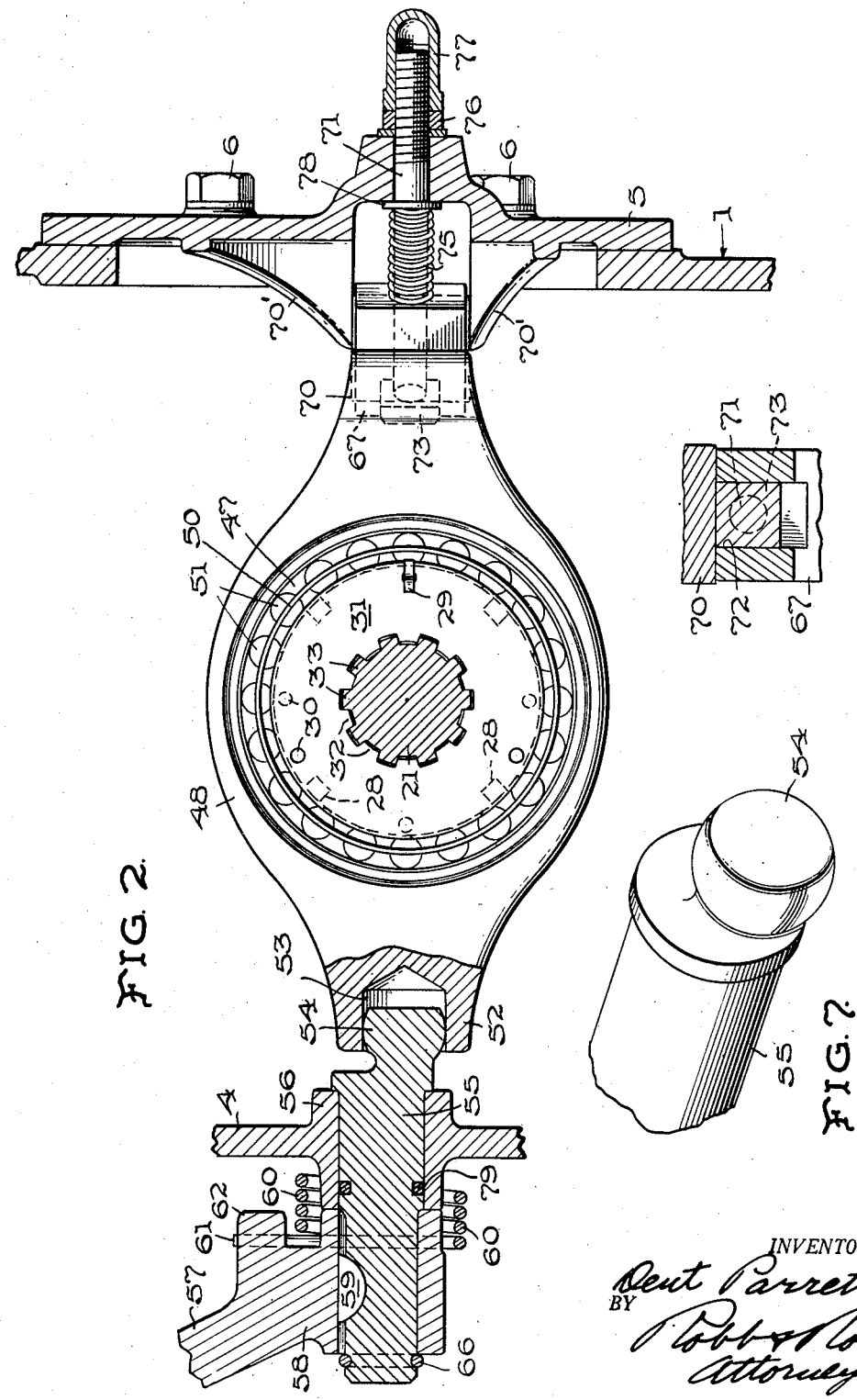
INVENTOR.
Dent Parrett
BY
Robb & Robb
Attorneys.

Jan. 21, 1958 D. PARRETT 2,820,538
ADJUSTABLE CLUTCH RELEASE AND OPERATING MECHANISM
Filed Feb. 4, 1954 3 Sheets-Sheet 3
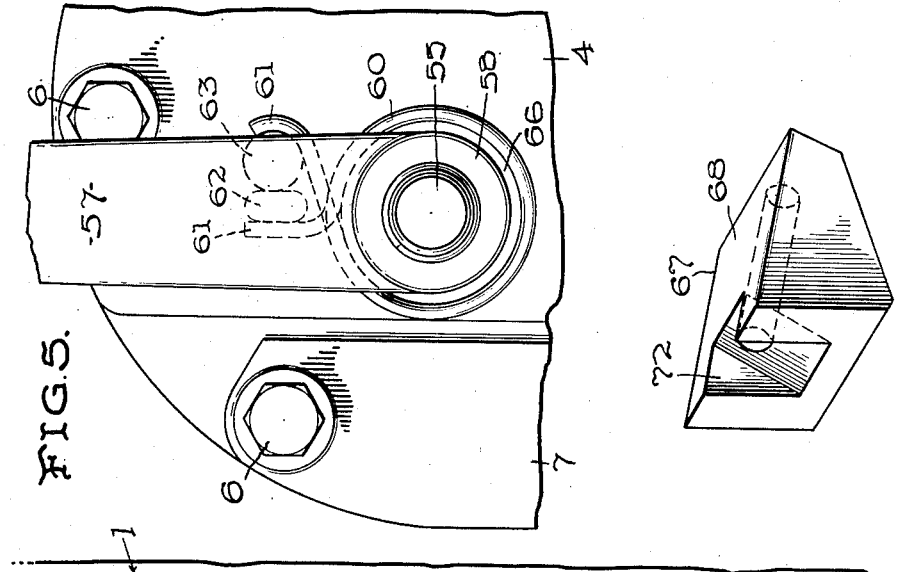
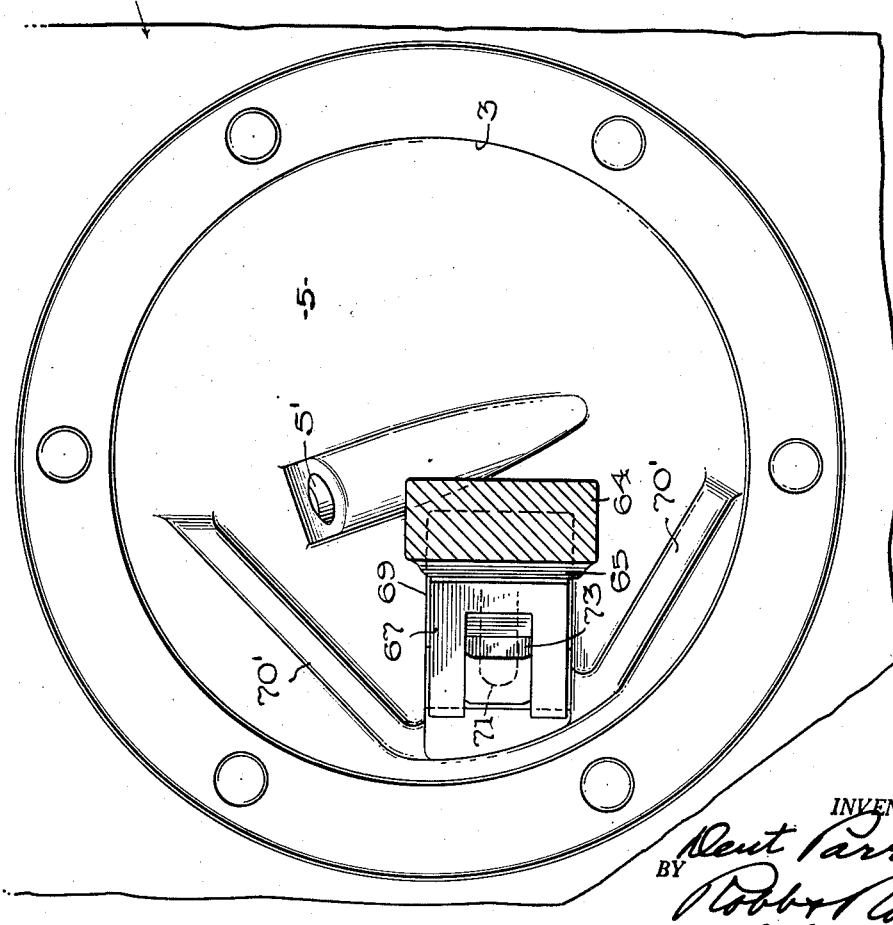
INVENTOR.
Dent Parrett
BY
Robt T Cobb
Attorneys United States Patent Office 2,820,538
Patented Jan. 21, 1958

2,820,538

ADJUSTABLE CLUTCH RELEASE AND OPERATING MECHANISM

Dent Parrett, St. Joseph, Mich., assignor, by mesne assignments, to Lambert Brake Corporation, St. Joseph, Mich., a corporation of Michigan Application February 4, 1954, Serial No. 408,165

6 Claims. (Cl. 192—93)

The present invention relates to an improved clutch release and operating mechanism, and more particularly to an adjustable release and operating mechanism for clutches of the normally engaged, spring-loaded type.

Recently, clutches of a very small size, but having an extremely high torque capacity, have been developed for installation in the conventional change speed gear transmission of farm tractors so as to provide an auxiliary clutch to control the drive for the power take-off shaft of such tractors, which renders auxiliary farm equipment continuously operable, while allowing interruption of the drive to the traction wheels of the tractor. These clutches heretofore, however, have been associated with release or throw-out mechanisms which occupy considerable space in addition to that occupied by the clutch proper.

Obviously, the space limitations in a conventional transmission housing of a tractor are such that it is extremely difficult to produce a clutch and release mechanism which may be installed in the transmission system without requiring any substantial alteration of the transmission system itself or the housing therefor. In some types of commercially successful farm tractors, for example, the problems of space limitation have heretofore made it impractical to include an auxiliary clutch of the aforesaid type, due to the fact that adaptation of the transmission housings thereof for this purpose would require major redesign, involving costly re-tooling and an accompanying major increase in price.

More recently an improved clutch release and operating mechanism has been developed for use with the aforementioned type of auxiliary clutch. This clutch release and operating mechanism generally includes a yoke or collar adapted to be connected to a throw-out member for the clutch, the yoke being pivotally mounted at one side of the transmission housing and having an operative connection at the other side of the housing with means for effecting pivotal movements of the yoke or collar. Since the throw-out member, or at least the clutch pressure plate, must shift axially to effect proper and smooth clutch engagement and disengagement, means for connecting the throw-out member to the yoke or collar includes a self-aligning bearing structure, whereby pivotal movements of the yoke or collar effect only axial movements of the throw-out member of the clutch, without imparting undue strains and stresses to the bearing.

The aforementioned throw-out or release and operating mechanism requires a minimum of space for association with an auxiliary clutch in a conventional transmission housing, but certain problems are encountered in installing the release mechanism in, for instance, different makes of farm tractors, or in different models of the same make of farm tractor, or in applying the release and operating mechanism to different clutches in the same model tractor, as may be determined by the existing requirements for torque capacity of the auxiliary clutch. Such a problem arises primarily in the case of tractors in which the dimensions of the transmission housings vary in different models or styles, and wherein the release and operating mechanism may be capable of undesirable vibration and rattle, or wherein the pivotal mounting for the yoke or collar is not properly located with relation to the clutch, with the result that smoothness of clutch engagement is not attainable.

A primary objective of the present invention is to provide a clutch release and operating mechanism as aforesaid, which includes improved means for pivotally mounting the release and operating yoke or collar at one side of a transmission housing in such a manner as to preclude looseness and rattle of the mechanism and so as to compensate for housing or clutch variations which would otherwise cause misplacement of the pivotal mounting for the yoke or collar with relation to the means for effecting pivotal movements of the yoke or collar.

Specifically, it is an object to provide a clutch release and operating mechanism as aforesaid, which includes means for adjusting the pivotal mounting for the yoke or collar, this adjusting means including a shiftable cam or wedge on which the yoke or collar pivots, and means for shifting the cam or wedge so as to effect adjustments in the location of the center of the pivotal movements of the yoke or collar, by shifting the center in a direction axial and parallel with relation to the clutch.

Other objects, advantages and features of the invention will be hereinafter described or will become apparent to those skilled in the art, and the novel features thereof will be defined in the appended claims.

In the drawings:

Fig. 1 is a view partly in top plan and partly in section of a portion of a conventional transmission assembly of a wellknown farm tractor, with the top of the housing broken away to disclose a small auxiliary clutch of a known form and the novel release and operating mechanism of this invention in association with the clutch, the clutch and release mechanism being shown in horizontal section, and one closure plate for the housing being broken away to reveal the adjustable mounting for the clutch release and operating yoke or collar;

Fig. 2 is a view in vertical section, as taken on the line 2—2 of Fig. 1;

Fig. 3 is a view in vertical section, as taken on the line 3—3 of Fig. 1;

Fig. 4 is an enlarged detail view in perspective of the cam or wedge for adjusting the center of pivotal movements of the clutch release and operating yoke or collar;

Fig. 5 is an enlarged fragmentary view in side elevation of a portion of the left-hand closure plate of Fig. 1, showing the operating lever and its mounting;

Fig. 6 is an enlarged fragmentary view in section, as taken on the line 6—6 of Fig. 1; and Fig. 7 is an enlarged fragmentary view in perspective of the operating shaft for the release and operating mechanism.

Figure 1:
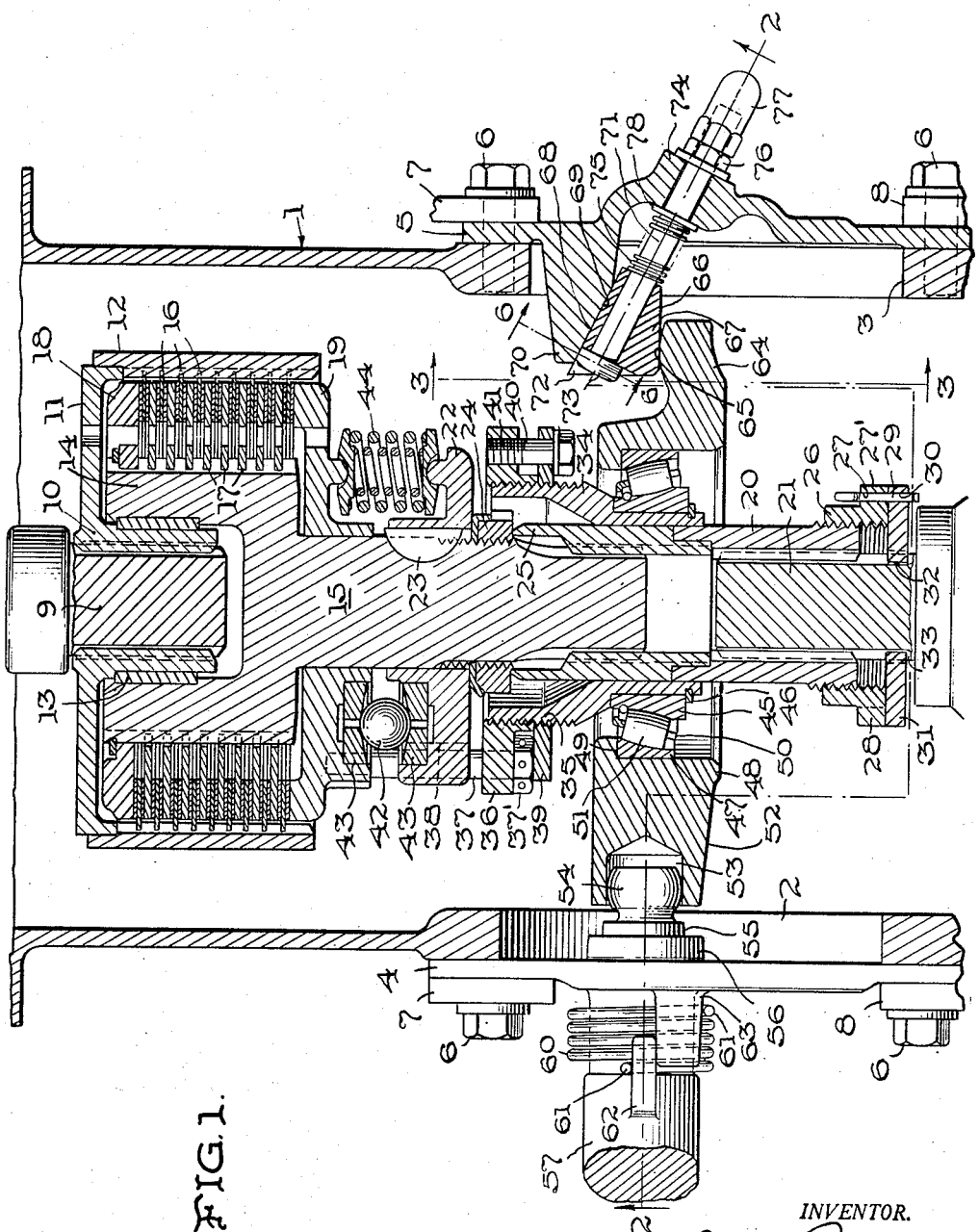

Like reference characters in the several views of the drawings and in the following description designate corresponding parts, wherein 1 generally denotes a housing of a conventional transmission mechanism as now utilized on a widely known and used farm tractor. The opposite sides of the housing 1 are formed with a pair of openings 2 and 3, and these openings are closed by plates 4 and 5, respectively. The plates 4 and 5 are usually secured to the housing 1 by means of a number of screw fasteners 6, and clamped between the heads of the screws 6 and the plates 4 and 5 and towards the front of the housing 1 is a pair of brackets 7 which are utilized to support the conventional foot rests (not shown) for the operator of the tractor. Towards the rear end of the housing 1 there is a pair of small plates 8 secured between the heads of certain of the screws 6 and the closure plates 4 and 5, these plates 8 being conventionally adapted to be engaged by a pivotal dog (not shown) carried by the conventional brake operating mechanism of the tractor (not shown) to lock the tractor brakes on. These details are not material to the present invention and therefore need not be further described.

Extending into the housing 1 from one end thereof is a transmission shaft 9 for the transmission gearing. Splined on the end of the shaft 9 so as to rotate therewith is a splined hub 10 of a power plate 11, and suitably secured to the outer marginal edge of the power plate 11 is a cylindrical sleeve or housing 12. Journaled on the hub 10 by means of a bearing 13 is an enlarged terminal hub 14 of a clutch shaft 15 which extends axially rearwardly. The opposed faces of the shell 12 and the hub 14 are each suitably splined to mate with complemental splines on a pack of interleaved friction elements or discs 16 and 17, the discs 16 being splined to the shell 12 and the discs 17 being splined to the hub 14 for rotation with and for axial sliding movements relative to said shell and hub. The hub also has a stationary pressure plate or flange 18 secured thereto for rotation therewith, and slidably and rotatably mounted on the clutch shaft 15 is a shiftable pressure plate or primary actuating disc 19 which is adapted to be shifted axially towards the relatively stationary plate 18 to shift the friction discs 16 and 17 into frictional engagement with each other and up against the plate 18. When the discs 16 and 17 are so engaged, power will be transmitted from shaft 9 through power plate 11, shell 12 and friction discs 16, and thence through friction discs 17 to the clutch shaft 15. The rear end of clutch shaft 15 is suitably splined to receive one end of a slack adjuster sleeve 20 which is interiorly splined for engagement with the clutch shaft 15 and with an end of a shaft 21, whereby power or torque imparted to the clutch shaft 15 is transmitted to the traction wheels (not shown) of a tractor vehicle or the like.

In the illustrated clutch, a relatively stationary plate or secondary actuating disc 22 is keyed on the clutch shaft 15, as by means of a Woodruff key 23. A lock nut and washer assembly 24 holds the secondary disc 22 against rearward movement on shaft 15, and this nut 24 may be adjusted on the shaft 15 to effect adjustment of the clutch, if necessary.

In order to eliminate end play of the clutch between shafts 9 and 21, the aforementioned slack adjuster sleeve 20 has one of its ends 25 engaged with the lock nut assembly 24, and the other end of the sleeve 20 is threaded so as to receive an interiorly threaded lock-nut 26. The lock-nut 26 has a radially extended flange 27 provided with a suitable number of recesses 28 which are adapted to receive a suitable tool for turning the nut 26. Through the flange 27 are a plurality of openings 27' through which a suitable member, such as a cotter pin 29 or the like may pass, this cotter pin being selectively engageable in one of a number of openings 30 through a thrust washer 31 so as to lock the nut 27 in a selected adjusted position, with the thrust washer engaged about its inner splined periphery 32 with short splines 33 on the shaft 21 and thrust up against the ends of the grooves between the splines 33. Thus, slack or end play between the clutch shaft 15 and the output shaft 21 is eliminated.

Freely mounted on the slack adjuster sleeve 20 is an axially shiftable release sleeve or member 34 having an enlarged or belled, exteriorly threaded end 35. Threaded on the end 35 of this release sleeve is an annular release flange 36. A suitable number of shoulder bolts 37 interconnect the release flange 36 with the primary disc 19, the outer margin of the secondary disc 22 being suitably formed so as to provide clearance space 38 for the shoulder bolts 37. An annular retainer ring 39 is also threaded on the end 35 of release sleeve 34 and is adapted to retain the shoulder bolts 37 in place by holding the head 37' of each bolt against the release flange 36. A suitable number of headed studs 40 extend through the ring 39 and threadedly engage in a like number of openings 41 in the flange 36 so as to lock the ring 39 to the flange 36.

Disposed between the primary actuator disc 19 and the secondary actuator disc 22 is a plurality of energizing balls 42, these balls preferably being seated in a pair of opposed inserts 43, 43 having conical seats therein; and also disposed between these actuator discs is a plurality of clutch engaging spring assemblies 44. These balls and spring assemblies are preferably equi-distantly spaced about the axis of the clutch in alternate relation.

The operation of the clutch is such that power or torque is transmitted from the shaft 9 through the power plate 11 and the housing sleeve 12 to the friction discs 16, and since the primary disc normally maintains the discs 16 shifted into engagement with the intermediate discs 17 by the action of the springs 44, the torque is thus transmitted to the clutch shaft 15. Load on the clutch in excess of its spring-loaded capacity will tend to cause the clutch shaft 15 to lag slightly, with resultant tendency of the friction discs to slip. However, the secondary actuator disc 22 which is keyed on the shaft 15 will lag slightly therewith, while the primary disc 19 which is freely rotatable on the shaft 15 will be carried along with the power input shaft 9 and the splined power plate 11 and sleeve 12, by reason of the fact that it is in frictional contact with one of the friction discs 16 that are splined to the housing 12. Thus, a slight relative rotation will occur between the primary and secondary discs 19, 22, which relative rotation will cause the balls 42 to ride up the inclined faces of the conical seats in the inserts 43, with an attendant positive and powerful camming action. This camming action of the balls forces the friction discs 16 and 17 into engagement with each other with a tremendous force, so that slippage of the discs is virtually imposible, with the result that the clutch has an extremely high torque capacity for its size.

In order to disengage the clutch, the primary disc 19 must be shifted axially toward the secondary disc 22, against the force of the springs 44, and this is done by shifting the release sleeve 34 axially away from the clutch proper.

According to the primary objectives of this invention, I provide a mechanism for effecting the aforesaid axial shifting movements of the release member 34 which is extremely compact and simple. This release mechanism comprises a self-aligning release bearing assembly, the inner race or cone 45 of which is seated on the release member 34 and secured thereon by means of a snap ring 46 fitting in a suitable annular groove in the outer periphery of the member 34. An outer bearing race or cup 47 is seated about the inner periphery of a pivotal release collar 48, the collar 48 being provided with a shoulder 49 for positioning the bearing cup 47. Interposed between the cone 45 and the cup 47 is a carrier 50 having a plurality of roller bearings 51 rotatably mounted therein.

Each roller bearing 51 is formed so as to have its race-contacting surface arched longitudinally, and the contiguous faces of the races 45 and 47 are likewise arched. In addition to having their contacting faces arched, the central axes of the rollers 51 and the operative faces of the races 45 and 47 are disposed at an angle converging toward the clutch proper, whereby pivotal movement of the release collar, with resultant cocking of the outer race 47, will impart axial movement to the inner race 45, the arcuate and angular relation of the bearing parts compensating for such angular displacement of the parts without overloading the bearing assembly.

The clutch and the self-aligning bearing structure just described constitute illustrative embodiments and may be of other specific types, the present invention being more particularly concerned with the novel adjustable release and operating means operative in conjunction with any suitable self-aligning throw-out bearing structure to respectively release the clutch and to allow the same to become engaged.

In accordance with this invention, one side of the collar 48 is provided with a lateral extension 52 having a socket 53 therein. This socket 53 is adapted to receive an extension 54 on the inner end of a rock shaft 55 which is rockably mounted in a bearing support 56 formed on the closure plate 4. As is best seen in Figs. 2 and 7, the end extension 54 on shaft 55 is eccentrically disposed on the shaft 55, whereby rotation of the shaft 55 will impart movement to the collar 48.

In order to rock the shaft 55, a lever 57 is provided, this lever preferably having an enlarged bored end 58 mounted on the outer end of the shaft 55 and suitably keyed thereto, as by means of a Woodruff key 59 or the like. A snap ring 66 or other suitable means is utilized to retain the lever 57 on the shaft 55, with the enlarged end 58 of the lever in abutting contact with the bearing portion 56 of plate 4.

A torsion spring 60 is disposed about the bearing support 56 and the adjacent portion of the end 58 of lever 57, this spring having terminal ends offset as at 61, 61 for engagement with co-operative stop lugs 62 and 63 on the lever 57 and the closure plate 4, respectively. The spring 60 thus normally maintains the stops 62 and 63 in abutting contact, and in this position, the eccentric 54 is preferably in transverse alignment with the shaft 57 and preferably with the collar 48.

In order to compensate for variations in different transmission housings, the present invention includes means for adjustably mounting the side of the collar 48 opposite the lateral extension 52 for pivotal movements on a center which is adjustable longitudinally of the housing, so as to assure transverse alignment of the eccentric end 54 of the shaft 55, the collar 48 and the pivotal mounting for the collar 48 now to be described, when the clutch is engaged.

Projecting laterally from the collar 48 is an arm 64 having an arcuate bearing surface 65 thereon which is adapted to rockably seat upon a flat face 66 of an adjustable cam or wedge 67. The wedge 67 is generally in the form of a right-angle triangle, the hypotenuse 68 of which is slidably supported on an inclined face 69 of an inwardly projecting lug or projection 70 formed on the inner face of the closure plate 5, the projection 70 preferably being formed integrally with the plate 5 and being reinforced by means such as a pair of webs 70'.

The wedge 67 is bored in parallel relation to the hypotenuse 68 to receive a bolt 71, and in its inner corner, the wedge is slotted as at 72 to receive the head 73 of the bolt 71 to prevent rotation of the bolt in the wedge. The plate 5 is formed so as to provide a supporting portion 74 for the bolt 71, this portion 74 being drilled to permit passage of the bolt 71 therethrough. Surrounding the bolt 71 between the wedge 67 and plate 5 is a coiled spring 75 which will normally urge the wedge 67 away from the plate 5, and adapted to selectively adjust the position of the wedge 67 is a nut 76 which is threadedly engaged with the bolt 71 exteriorly of the plate 5. A cap nut 77 is threadedly engaged with the outer end of the bolt 71 and cooperates with the nut 76 to lock the bolt in a selected adjusted position.

In view of the fact that transmission housings usually contain lubricating oil for the transmission gearing, a sealing washer 78 is interposed between the spring 75 and the closure plate 5 to prevent leakage about the bolt 71. For the same reason, the aforesaid rock shaft 55 is preferably provided with an annular seat for the reception of an O-ring seal 79 to prevent the seepage of lubricant past the shaft 55. Furthermore, the plate 5 is preferably provided with an opening 5' through which a dip-stick may be inserted to determine the oil level in the housing.

In an installation such as that illustrated, the clutch may be adapted to operate wet in the oil containing housing, or if desired, it may be sealed so as to be capable of dry operation in an environment of oil. In either case however, the clutch release and operating mechanism will be continuously well lubricated, with resultant long and trouble-free life.

In operation, when it is desired to release the clutch (which is shown in an engaged condition in Fig. 1), the lever 57 will be shifted so as to rock the shaft 55 in a counter-clockwise direction. This will cause the eccentric 54 to effect a pivotal movement of the collar 48, with the point of contact of the arm 64 with the wedge 67 constituting the center of the pivotal movement or a pivot point. The self-aligning bearing assembly will effect axial movement of the release sleeve 34 in a direction to shift the clutch pressure plate 19 away from plate 18, thus releasing the friction discs 16 and 17 and interrupting the transmission of torque through the clutch.

To re-engage the clutch, it is only necessary to release the lever 57 and the spring-loaded clutch will become engaged, assisted by the self-energizing action of the camming balls 42.

In any installation, when the clutch and release mechanism are assembled on the shafts 9 and 21, the position of the collar 48 can be readily adjusted so that it is substantially disposed in right-angular relation to the axis of the clutch when the clutch is engaged, thus assuring normal alignment of the throw-out bearing assembly when the clutch is engaged. Accordingly, smooth engagement of the clutch will be assured, and vibration and rattle caused by mis-alignment of the assembly is precluded.

Such adjustment is performed by first loosening the cap nut 77 and then turning the nut 76 on bolt 71 so as to shift the wedge 67 in one direction or the other, depending upon the direction it is necessary to shift the pivot point of the collar with relation to the shaft 55 and the eccentric 54 so as to substantially align the collar 48 with the eccentric, with the shaft, and with the pivotal mounting for the collar.

While the specific details of the present invention have been herein shown and described, changes and alterations may be resorted to without departing from the spirit thereof as defined in the appended claims.

I claim:

1. Clutch release and operating mechanism of the class described, comprising an axially shiftable member, a pivotal member, self-aligning bearing means intermediate said members, a support at one side of said pivotal member, mounting means on said support for pivotally mounting said pivotal member, a support at the other side of said pivotal member, operating means carried by the latter support for effecting pivotal movements of said pivotal member, and means for adjusting said mounting means to align said operating means, said pivotal member and said mounting means relative to each other, said mounting means including a shiftable cam on which said pivotal member is rockably seated.

2. Clutch release and operating mechanism of the class described, comprising an axially shiftable member, a pivotal member, self-aligning bearing means intermediate said members, a support at one side of said pivotal member, mounting means on said support for pivotally mounting said pivotal member, a support at the other side of said pivotal member, operating means carried by the latter support for effecting pivotal movements of said pivotal member, and means for adjusting said mounting means to align said operating means, said pivotal member and said mounting means relative to each other, said mounting means including a shiftable cam on which said pivotal member is rockably seated, the adjusting means comprising a member connected to said cam and extending through said support, and means engaged with said latter member to shift the same in opposite directions.

3. Clutch release and operating mechanism of the class described, comprising an axially shiftable member, a pivotal member, self-aligning bearing means intermediate said members, a support at one side of said pivotal member, mounting means on said support for pivotally mounting said pivotal member, a support at the other side of said pivotal member, operating means carried by the latter support for effecting pivotal movements of said pivotal member, and means for adjusting said mounting means to align said operating means, said pivotal member and said mounting means relative to each other, said mounting means including a projection on said support, a wedge slidably mounted on said projection, and a member carried by said wedge and extending through said support, said adjusting means including means operative on the last-mentioned member to shift the same in one direction, and means for shifting the same in the other direction.

4. A pivotal mounting for a clutch release and operating member, comprising a supporting plate, a projection on said plate, a generally triangular wedge slidably mounted on one of its sides on said projection, a member carried by said wedge and projecting through said plate, a spring interposed between said plate and said wedge and urging said wedge away from said plate, and means on the member carried by the wedge for shifting said wedge towards said plate and maintaining said wedge in a selected position.

5. A pivotal mounting as defined in claim 4, wherein the member carried by the wedge comprises a headed bolt, said wedge having a socket in which the head of said bolt is engaged, said wedge having a face in parallel relation to said bolt and slidably engaged with a face on said projection, and said wedge also having a face disposed at an angle to said projection engaging face.

6. A pivotal mounting for a clutch release and operating member, comprising a support, a projection on said support, a camming element freely slidably supported on said projection, said camming element having a fulcrum face disposed for pivotal engagement by a portion of the clutch member, and said camming element being in the form of a generally triangular wedge, said wedge having a member carried thereby and projecting through said support, and means for shifting said camming element including resilient means interposed between said wedge and said support and urging the wedge in one direction, and means engaged with said wedge-carried member and with said support for shifting said wedge in the opposite direction.

References Cited in the file of this patent

UNITED STATES PATENTS

| | | |
|---|---|---|
| 383,104 | Crowell | May 22, 1888 |
| 900,397 | Lange | Oct. 6, 1908 |
| 1,552,368 | Whitacre | Sept. 1, 1925 |
| 2,090,787 | Eberhard | Aug. 24, 1937 |
| 2,451,325 | Eksergian et al. | Oct. 12, 1948 |
| 2,624,437 | Gardner | Jan. 6, 1953 |
| 2,702,106 | Strahota et al. | Feb. 15, 1955 |

FOREIGN PATENTS

| | | |
|---|---|---|
| 159,674 | Australia | Nov. 8, 1954 |
| 761,185 | France | Jan. 3, 1934 |